United States Patent [19]

Green

[11] Patent Number: 4,763,329

[45] Date of Patent: Aug. 9, 1988

[54] MODULAR DATA ROUTING SYSTEM

[75] Inventor: Michael W. Green, St. Louis, Mo.

[73] Assignee: Techlan, Inc., Mo.

[21] Appl. No.: 827,415

[22] Filed: Feb. 10, 1986

[51] Int. Cl.⁴ .................... H04L 1/22; G06F 11/16
[52] U.S. Cl. .................... 371/11; 340/825.02; 364/200
[58] Field of Search .............. 371/8, 11; 340/825.02, 340/825.16; 364/200

[56] References Cited

U.S. PATENT DOCUMENTS

| | | | |
|---|---|---|---|
| 3,458,661 | 7/1969 | Forde et al. | 179/15 |
| 3,519,750 | 7/1970 | Beresin et al. | 179/15 |
| 3,519,935 | 7/1970 | Hoghgraf | 325/2 |
| 3,544,976 | 12/1970 | Collins | 340/172.5 |
| 3,581,075 | 5/1971 | Mattsson et al. | 235/153 |
| 3,652,798 | 3/1972 | McNeilly et al. | 179/15 |
| 3,692,964 | 9/1972 | Camiciottoli et al. | 179/175.31 |
| 3,716,834 | 2/1973 | Adams | 340/147 R |
| 3,749,845 | 7/1973 | Fraser | 179/15 AL |
| 3,755,789 | 8/1973 | Collins | 340/172.5 |
| 3,859,468 | 1/1975 | Smith et al. | 179/15 AL |
| 3,876,983 | 4/1975 | Zafiropulo et al. | 340/147 SC |
| 3,879,710 | 4/1975 | Maxemchuk et al. | 340/172.5 |
| 3,944,723 | 3/1976 | Fong | 340/825.02 |
| 3,959,606 | 5/1976 | Merlet et al. | 179/175.31 |
| 4,002,847 | 1/1977 | Dail | 179/15 AL |
| 4,035,770 | 7/1977 | Sarle | 340/147 R |
| 4,075,440 | 2/1978 | Laubengayer | 179/175.3 |
| 4,127,816 | 11/1978 | Grosso et al. | 325/67 |
| 4,245,343 | 1/1981 | Frey | 371/11 |
| 4,264,894 | 4/1981 | Ellington | 371/11 |
| 4,266,271 | 5/1981 | Chamoff et al. | 364/200 |
| 4,276,643 | 6/1981 | Laprie et al. | 371/8 |
| 4,307,446 | 12/1981 | Barton et al. | 364/200 |
| 4,393,492 | 7/1983 | Bishop | 370/15 |
| 4,583,088 | 4/1986 | Bux et al. | 340/825.02 |

OTHER PUBLICATIONS

Davies and Barber, Communication Networks for Computers, John Wiley & Sons, 1973, pp. 27, 28, 134–136, 166–169.

Primary Examiner—Charles E. Atkinson
Attorney, Agent, or Firm—Polster, Polster and Lucchesi

[57] ABSTRACT

A modular system for controlling the routing of data through a plurality of data terminals includes a number of modules in a tree structure. Each of the modules has circuitry for receiving a data stream. Each of the modules further has a plurality of ports, each port being suitable for transmitting data to and receiving data from data devices such as data terminals and other modules. Each of the modules includes a routing array connected to the ports for serially connecting the ports for flow of the data stream through the operable data devices connected to the ports. The routing array is internally controllable to open a selected one of a plurality of data paths between the ports. At least some of the ports have driver circuits associated therewith for regenerating and converting the data stream as it passes between ports in the selected data path. Each module has an output for supplying the data stream from the module to a destination device. Detecting circuitry is included in each module for automatically detecting a fault between the input and output of that module. The detecting circuitry is responsive to the detection of such a fault to control the routing array to open a fault-free data path between the input and output of the module if any such path exists.

40 Claims, 6 Drawing Sheets

MODULAR DATA ROUTING SYSTEM

BACKGROUND OF THE INVENTION

This invention relates to improved control systems for interconnecting data terminals. It is known to interconnect a number of data terminals, such as point of sale terminals in a store, in a serial fashion with a contral computer or controller so that data flows in a predetermined order from data terminal to adjacent data terminal and eventually to the central computer. Such systems are shown in U.S. Pat. Nos. 4,035,770 to Sarle and 3,519,935 to Hochgraf for example. The data terminals in such systems have heretofore been connected in a number of loops (usually three). Each loop is connected directly to the central controller and has a plurality of terminals (typically 20 to 65) connected in series. The controller in these prior systems defines the beginning and end of each loop. In addition each loop can contain a number of subloops, with the ends of the subloops disposed near the controller. The subloops are provided to reduce the amount of time the loop system is inoperative. Since the data terminals are connected in series within a loop, without the provision of subloops a single fault would result in the failure of the entire loop. This can be a very expensive failure in the event of loops containing large numbers of terminals.

The system described in the Sarle patent works quite well for its intended purpose, but it could be improved. For example, the particular structure of the Sarle network in some circumstances results in an undesirable amount of wiring since the subloops each begin and end near the controller. In addition, in Sarle there is no express provision for regenerating the signal or data stream as it flows from data terminal to data terminal. This can become a problem: when a number of terminals in the subloop are powered off. The signal can become so attenuated by the time it reached in operative terminal that the information in the signal is lost. Hochgraf does describe repeater or driver circuits between adjacent terminals, which address this problem. But in Hochgraf the solution for a failure in the loop is to cut off all terminals in the loop located downstream from the failure. That can be inefficient when the fault is located far upstream.

Sarle also teaches the automatic identification of the fault and the switching out of any subloops containing a fault, but the switching is done with electro-mechanical relays wnich are not desirable for use with data systems.

The speeds of prior systems have been limited by the fact that the data signals have been bipolar. Switching of these bipolar data signals heretofore has required transformers, which are relatively heavy, expensive and slow, rather than digital devices which are capable of significantly higher data rates.

In addition, because of the loop and subloop structure of the prior systems, flexibility in the placement of additional terminals in the system was less than could be desired without greatly increasing the amount of wiring.

SUMMARY OF THE INVENTION

Among the various objects and features of the present invention may be noted the provision of an interconnection system for data terminals which is self-diagnosing and reliable.

Another object is the provision of an interconnection system which reduces the amount of wiring in the system.

A further object is the provision of an interconnection system with improved speed.

An additional object is the provision of an interconnection system whose operation and accuracy is unaffected by powered-off terminals connected to the system.

Another object is the provision of an interconnection system which is operable either under internal or external control.

A further object is the provision of an interconnection system which is inherently flexible in structure and permits the addition and deletion of terminals from the system at will without substantially increasing the amount of wiring required.

Other features and objects may be in part apparent and in part pointed out hereinafter.

Briefly, in a first embodiment the present invention is a modular system for controlling the routing of data through a plurality of data terminals. The system includes at least one first-level module and at least one second-level module. Each of the modules has means for receiving a data stream from a source, the first-level module being the source for the second-level module. Each of the modules further has a plurality of ports, each port being suitable for transmitting data to and receiving data from data devices such as data terminals and other modules. The second-level module is connected to a port of the first level module. Each of the mocules includes interconnecting means connected to the ports thereof for serially connecting the ports for flow of the data stream serially through the operable data devices connected to the ports. The interconnecting means is internally controllable to open a selected one of a plurality of data paths between the ports. At least some of the ports have driver means associated therewith for regenerating the data stream as it passes between ports in the selected data path. Each module has module output means for supplying the data stream from the module to a destination device, the destination device of the second-level module being the first-level module. Internal means for each module automatically detects a fault between the receiving means and the output means of that module and is responsive to the detection of such a fault to control the interconnecting means to open a fault-free data path between the receiving means and the output means if any such path exists.

The first method of the present invention concerns operating a plurality of data terminals and includes the following steps: Arranging the terminals in a plurality of groups and providing a module for each group of terminals for detecting and identifying faults in the operation of the module and associated terminals. Each module has a plurality of ports for connection to data terminals and modules. Include at least one module in at least some of the groups so that the modules form a tree structure. For each module, pass a data stream serially through the data terminals and modules connected to the ports thereof. For each module, determine whether a fault exists in the transmission of the data stream, and when a fault is detected, sequentially test the data terminals and modules connected to the module ports to identify any inoperative data terminals and modules.

A second method of the present invention concerns detecting a powered off data terminal in a serially connected network of data terminals having a data stream flowing therethrough. The data stream is compared at a point immediately upstream of a data terminal with the data stream at a point immediately downstream of the data terminal to determine the presence or absence of a unit delay in the data stream. The powered off condition of the terminal is detected if no unit delay is detected in the previous step over a predetermined length of time.

A modular system of the present invention for controlling routing of data through a plurality of data terminals includes at least one first-level module and at least one second-level module. Each of the modules includes circuitry for receiving a data stream from a source, the first-level module being the source for the second-level module. Each of the modules further has a plurality of ports, each port having circuitry for transmitting data to data devices such as data terminals and other modules and the circuitry for receiving data from data devices. The second-level module is connected to a port of the first-level module. The transmitting circuitry for each port includes circuitry for regenerating the data before it is transmitted to the terminal.

In another embodiment, a system of the present invention for controlling the routing of data through a plurality of data terminals includes at least one module having means for receiving a data stream from a source. The module further has a plurality of ports, each port having means for transmitting data to data devices such as data terminals and other modules and means for receiving data from data devices. The transmitting means for each port includes means for regenerating the data before it is transmitted to a data device connected to that port. The module further includes interconnecting means connected to the ports thereof for serially connecting the ports for flow of the data stream serially through the operable data devices connected to the ports. The interconnecting means is internally controllable to open a selected one of a plurality of data paths among the ports. The module has module output means for supplying the data stream from the module to a destination device. Internal means in each module automatically detect a fault between the receiving means and the output means. The detecting means is responsive to the detection of such a fault to control the interconnecting means to open a fault-free path between the receiving means and the output means if any such path exists.

BRIEF DESCRIPTION OF THE DRAWINGS

Similar reference characters indicate similar parts throughout the several views of the drawings.

DESCRIPTION OF THE PREFERRED EMBODIMENT

Turning now to the drawings, there is shown a system 11 (FIG. 1) of the present invention for routing data from and through a plurality of data terminals 13 to a conventional controller 15. The controller is such as the one shown and described in the above-mentioned Sarle patent. However, instead of the loop and subloop structure of the Sarle patent, the present system has the data terminals connected to the ports of a plurality of self-contained nodes or modules 17. The ports of any module 17 can accommodate a predetermined number (e.g. eight) of data terminals or other modules, so that the tree-like structure of FIG. 1 results. More specifically, in FIG. 1 one module 17 is directly connected to controller 15. That module in turn has three second-level modules connected to its output ports, as well as four data terminals. Likewise, the second-level modules have third-level modules and data terminals connected to their output ports, and one of the third-level modules has a fourth-level module connected thereto. With this structure, any number of modules may be connected together with any desired depth of the tree structure, limited by the desired response of the system. Of course, a single module 17 could be used in those situations where a limited number (e.g. eight or less) of terminals are needed in the system. Module 17 works well in both the tree structure shown in FIG. 1 and in the single-module structure.

Figure 1:
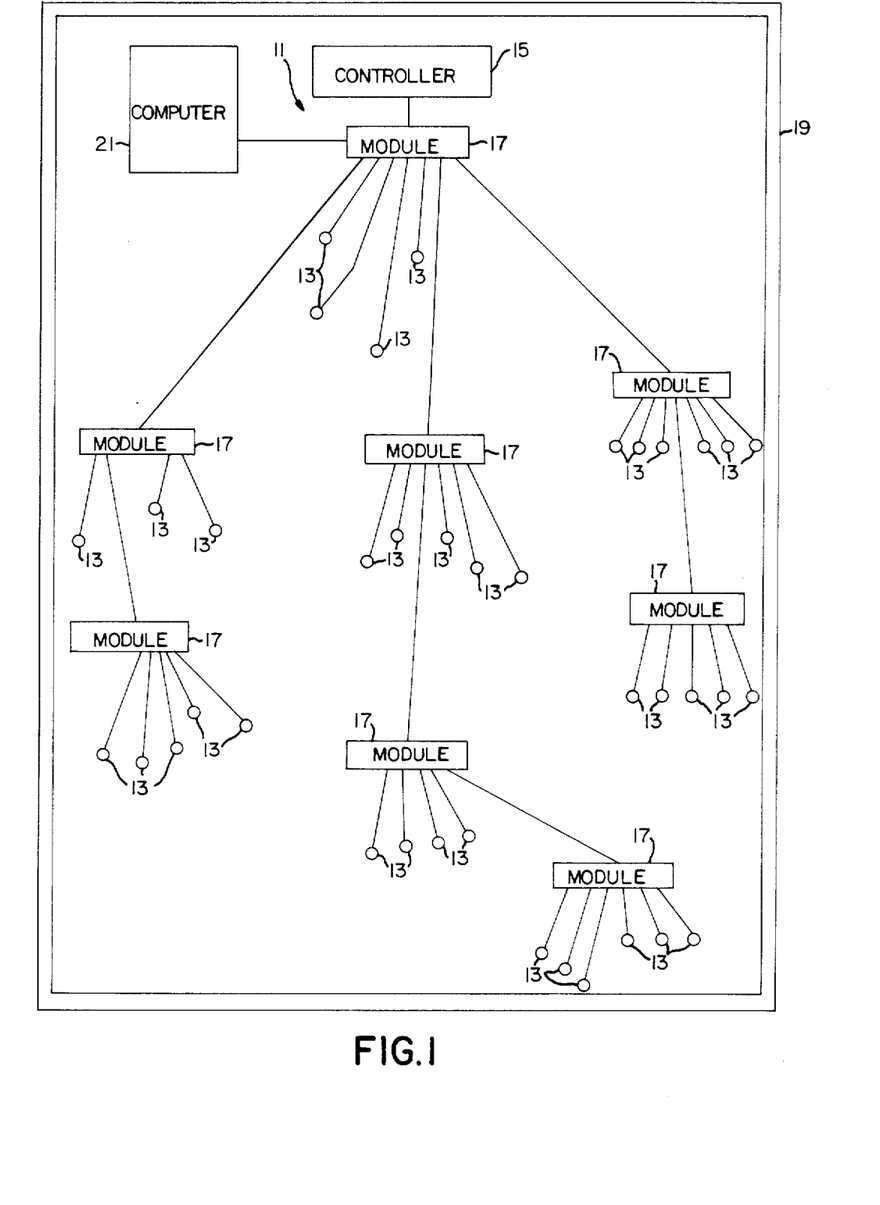
FIG. 1 is a schematic illustrating the system of the present invention disposed in a department store.

In FIG. 1, system 11 is shown disposed in a department store 19 or the like. Since the individual modules do not need to be connected directly to the controller 15 or even directly to the first-level module 17, they are placed in strategic locations around the store. This drastically reduces the amount of wiring required to interconnect all the data terminals into one serially connected system, while permitting the data terminals to be located in optimum locations throughout the store.

Also shown in FIG. 1 is a computer 21, which can optionally control modules 17 over an auxiliary communications port described below.

All the modules 17 are identical. Any one could be used, for example, as the only module in a single-module system. Each module 17 includes (FIG. 2) a receiving port 23, including a receiver 25, for receiving a data stream from a source. For example, the source for the first-level module or a module used alone (not shown) is controller 15, while the source for the second-level modules is the first-level module. The receiving port is connected through a digital routing array 27 to a plurality of communication ports 29. Each module has a predetermined number of communication ports (e.g., eight ports) which can be connected to data terminals, other modules, or left unconnected. Each port includes a driver 31 and a receiver 33 for regenerating the signals sent to and received from the data devices (either data terminals or modules) connected to that port, and for converting the signals between digital and bipolar form as described below.

Figure 2:
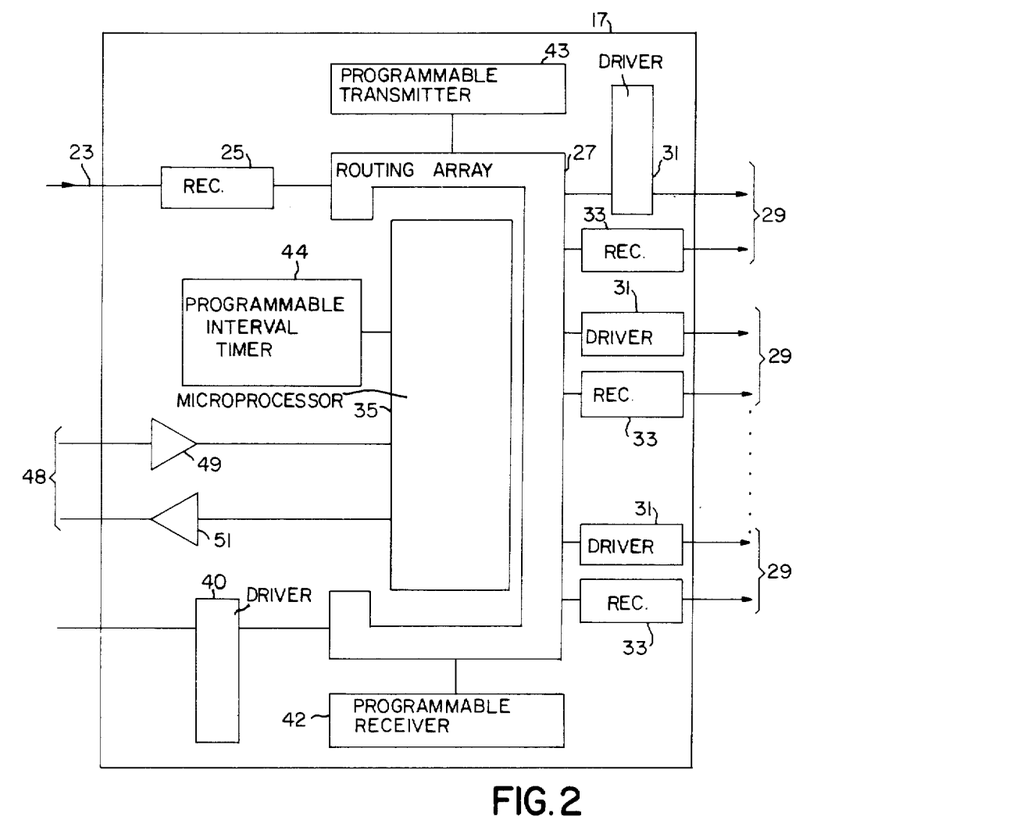
FIG. 2 is a block diagram illustrating a module of the present invention.

Routing array 27 constitutes interconnecting means connected to ports 29 for flow of the data stream from receiver 25 serially through the operable data devices conected to the ports. For example, assuming all the data devices connected to the ports are operable and powered on, the data stream flows first through the data device connected to the uppermost port 29, then through the next highest port and so on until the data stream has passed through all the data device connected to the ports. Note that if one of the data devices is a module, the data stream could flow through a number of data terminals connected to that lower-level module before it returns to the higher level module.

The routing array is under the internal control of a microprocessor 35 to open a selected one of a plurality of data paths between the ports. For example, if only the data device associated with the uppermost port 29 is operational, the path from receiver port 23 through the routing array will include only the uppermost port 29. Similarly, if there are eight data devices connected to the ports and device number five is not operational, the microprocessor will control the routing array 27 to open a path which includes seven of the ports, but excludes the port for device number five.

Routing array 27 is made up of nine data selectors 36 (FIG. 3), one for each port and one for the module itself. Each data selector includes two sets of four electronically controllable gates 37 and 38, the gates of the first set being labelled 37 and those of the second set 38. Microprocessor 35 controls the gates by means of a tetminal 39. A Low on terminal 39 selects, for example, gates 37 while a High selects gates 38. The upper two gates 37 are connected between the data source for that port (the receiver 25 in the case of the module itself, and the.previous port in the case of the ports) and, in the case of the ports, the corresponding driver 31. Two gates are required because the corresponding single lines shown in FIG. 2 are cables consisting of two lines each. The data stream at this point in the circuit is made up of two phases, one carried on each line. So long as the terminal or module connected to the port is operational the microprocessor selects gates 37 and the data stream flows through driver 31 to the data device (terminal or module) and from the data device back through receiver 33 to the lower gates 37. From lower gates 37 the data stream passes on to the next data selector 36 (in the case of the first seven ports) or to a driver 40 (FIG. 2) (in the case of the last port and the module). On the other hand, when the data device is not operational, the microprocessor selects gates 38 which causes a test message (see below) to be applied to driver 31 and the data stream to be routed directly to the next port's data selector (or to driver 40 in the case of the module itself and the last port). The output of receiver 33 is also supplied to a multiplexer 41 which is under control of the microprocessor as well. The output of the multiplexer is used for testing purposes as described below.

Figure 3:
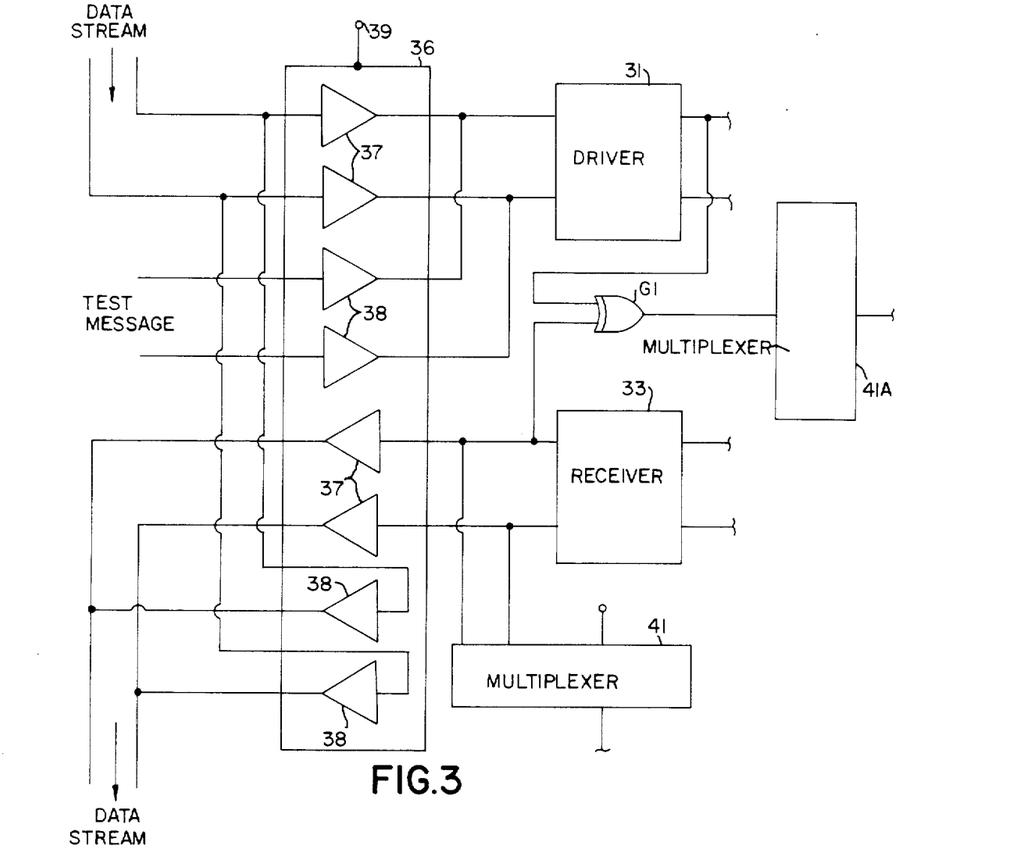
FIG. 3 is an electrical schematic of routing circuitry of the present invention.

The circuitry of FIG. 3 is also used to detect a powered-off terminal. For purposes of increased reliability of the system, report generation and the like, it is desirable to route powered-off terminals out of the system in the same way that inoperative terminals are routed out of the system by the circuitry of FIG. 3. The powered-off condition of a terminal connected to the circuitry of FIG. 3 is detected by means of an exclusive OR Gate G1. One input of the exclusive OR Gate is connected to one of the output lines of driver 31 which supplies a signal to the terminal. The other input to Gate G1 is connected to a corresponding line of receiver 33. This gate in effect makes a comparison of the data stream entering the terminal with the data stream exiting from the terminal. If the terminal is powered on, there will be a one bit delay between the input data stream and the output data stream so that the output of Gate G1 will be high from time to time. However, if the termina is powered-off, there is no unit or one bit delay introduced into the data stream and the two signals supplied to Gate G1 will be identical. As a result, the output of Gate G1 will remain low whenever the terminal is powered-off. The output of Gate G1 is supplied to a multiplexer 41A. Optionally, the output can be supplied to multiplexer 41 if sufficient ports are available in that multiplexer. The output of the multiplexer to which Gate G1 is connected is supplied to a computer such as computer 21 shown in FIG. 1. If the computer determines that the output of Gate G1 has remained low for a predetermined length of time, it concludes that the terminal to which that particular gate is connected is powered-off. It then orders the circuitry of FIG. 3 to route the data stream around the powered-off terminal. Once the terminal is powered on, the system will automatically reinsert it if programmed to do so.

After passing serially through the operational data devices, the data stream is supplied through driver 40 (FIG. 2) to a destination device. For example, the destination device of the second-level modules is the first-level module. Specifically, the output drivers of all the second-level modules are connected to ports 29 of the first-level module.

Figure 4:
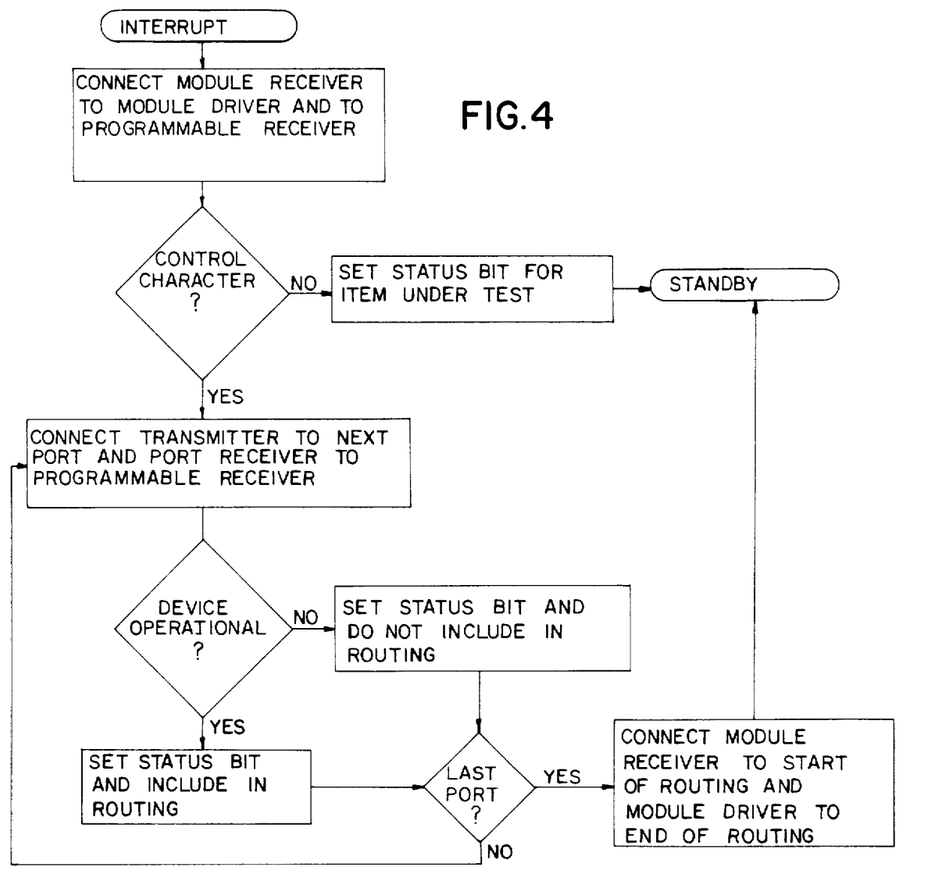
FIG. 4 is a flowchart of an interrupt routine run by the module of FIG. 2.

Module 17 also includes a programmable receiver 42 that continually examines first the input and then the output of the module at a constant interval (e.g., 1.6 seconds) to detect the presence of a predetermined control character or code word, such as a framing character in the data stream. If the control character is not found during a predetermined interval of time, it is assumed that a fault has occurred. The programmable receiver 42 thereupon generates an interrupt signal to microprocessor 35. The microprocessor in response initiates a sequence (see FIG. 4 for the flowchart of the sequence) which identifies the fault. More specifically, upon receipt of the interrupt signal, microprocessor 35 controls routing array 27 to connect the output of receiver 25 directly to driver 40 and to the programmable receiver 42, thereby bypassing all the ports 29. This has the effect of wrapping the module input to the module output and attaching the programmable receiver to the output, thus removing the entire module from the network. If the control character is still not found, the fault is presumably with the network itself and not with the module or its attached data devices, so the microprocessor sets a status byte in its memory to reflect this condition.

If on the other hand, the control character is present, that indicates that there is not a network failure and so the microprocessor controls the routing array 27 to connect a programmable transmitter 43 to the uppermost port 29 to test the operational status of the data device connected to that port. This is accomplished by supplying the test message of FIG. 3 to the uppermost gates 38 of that port and selecting those gates as described above. The receiver 33 of that uppermost port is connected by the routing array to the programmable receiver 42, by means of multiplexer 41, bypassing all the intervening ports, so that the signal recerved by the programmable receiver is affected only by the data device connected to the uppermost port. When the connection is made, the microprocessor instructs the programmable transmitter 43 to transmit a predetermined test pattern and notifies programmable receiver 39 of what to expect. An analysis is made of the received information and the microprocessor makes a decision regarding the operational characteristics of the data device connected to the uppermost port. If that device is operational and not powered off, the microprocesor will flag that port as operational in the status table in memory. It then controls the routing array to route the output of programmable transmitter 43 through that port and the next port of the module to the programmable receiver, and repeats the test described above. The microprocessor controls the routing array to exclude any inoperative ports from the data path as a result of this test. Once all the ports 29 are tested in this manner, the microprocessor has created a data routing path through the routing array that eliminates any ports that are not operational. When finished, the microprocessor controls the routing array to route the output of module receiver 25 to the first operational port and to route the output of the last operational port to driver 40. The microprocessor then returns from the interrupt sequence and awaits further commands. At this point, the module has reinserted itself into the network with only its operational ports as part of the network.

Figure 5:
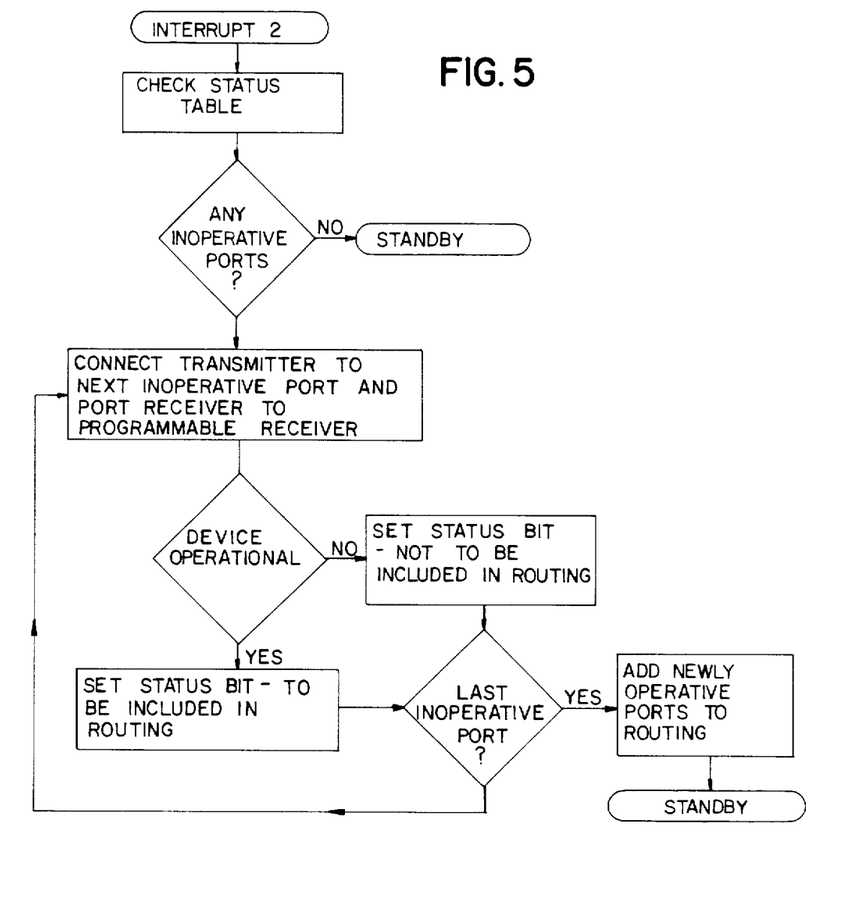
FIG. 5 is a flowchart of a second interrupt routine run by the module of FIG. 2.

Module 17 further includes a programmable interval timer 44 which is set during system initialization. Periodically, timer 44 generates a second interrupt signal to microprocessor 35 to cause the routine shown in the flowchart of FIG. 5 to be executed. In this routine the microprocessor examines the status table created in the interrupt sequence described above to determine which ports are currently inoperative. The microprocessor then tests those ports in sequence to determine if any of the ports are now operational. This testing is done by controlling the routing array to connect the programmable transmitter 43 to the first inoperative port and routing the programmable receiver to the receiver 33 of that port. As in the other interrupt routine, the test pattern is generated by programmable transmitter 43 and the resulting received information is received by programmable receiver 42 and analyzed by the microprocessor. The microprocessor then decides if the port under test is now operational. If not, the status entry in the status table is updated. If the port is now operational, microprocessor 35 changes the corresponding entry in the status table for that port to operational and begins the test of the next inoperative port. When all the previously inoperative ports have been tested in this manner, the microprocessor reviews the status table and creates a new routing path to incorporate those ports which are now operational into the data path. Thus, module 17 periodically checks previously inoperative ports and reinserts them into the network if they are operational.

Figure 6:
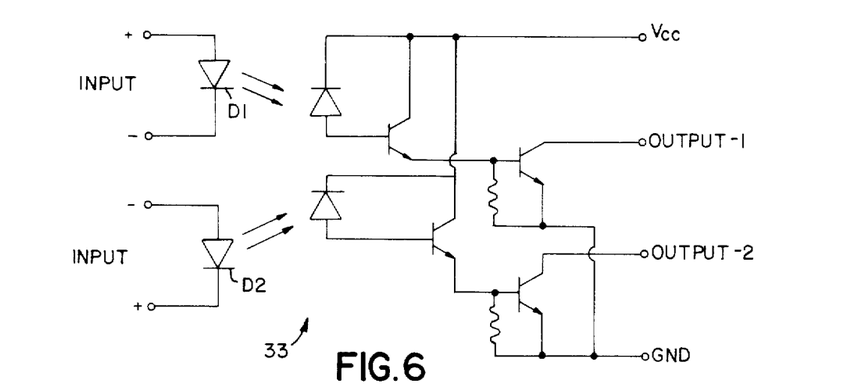
FIG. 6 is an electrical schematic illustrating isolating and decoding circuitry of the present invention.
Figure 7:
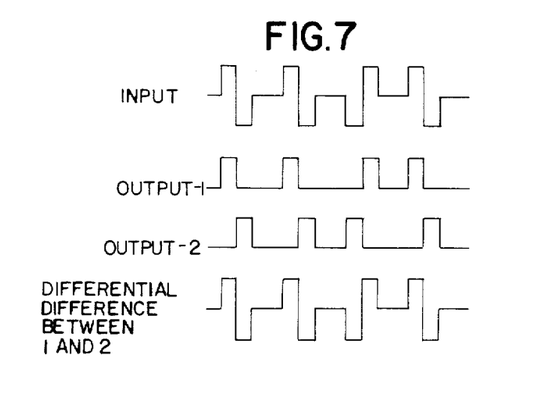
FIG. 7 is a waveform diagram illustrating the operation of the circuitry of FIG. 6

To provide increased operating speed, routing array 27 is made up solely of digital components. However, the data stream coming into the module is typically bipolar, not digital. For this reason receivers 25 and 33 decode the bipolar signal into a pair of digital signals representing the positive and negative components of the bipolar signal. Receiver 33 (FIG. 6) is a commercially available optical isolator such as the HCPL-2730 type optocoupler sold by Hewlett Packard. The optical isolator includes a pair of light emitting diodes D1 and D2 which are connected as shown to the input from the data terminal or other module. The input signal is connected across the diodes with opposite polarity so that one diode conducts when the signal is positive and the other conducts when the signal is negative. The bipolar signal appearing across the inputs to receiver 33 is illustrated by the waveform shown in the line labelled "INPUT" in FIG. 7. The receiver disassembles this bipolar signal into its two components, phase-1 and phase-2, which are labelled as OUTPUT-1 and OUTPUT-2 on FIG. 7. OUTPUT-1 is the isolated output of diode D1 and OUTPUT-2 is the isolated output of diode D2. This occurs because when the positive input line of FIG. 6 is positive with respect to the negative input line, current flows through diode D1 and no current flows through diode D2. And when the negative input line is positive with respect to the positive input line, current flows through diode D2 and no current flows through diode D1.

Figure 8:
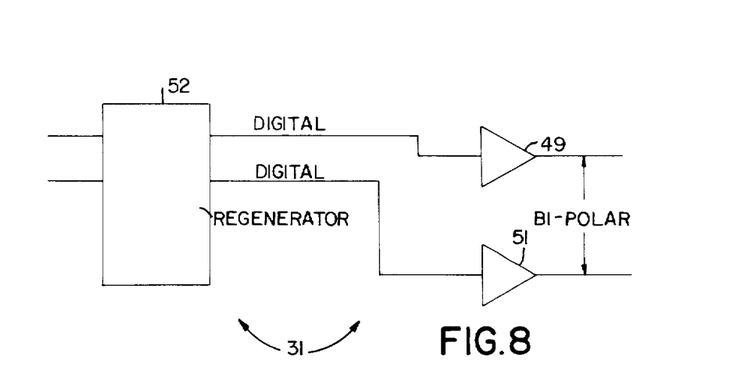
FIG. 8 is an electrical schematic of driver circuitry of the present invention.
Figure 9:
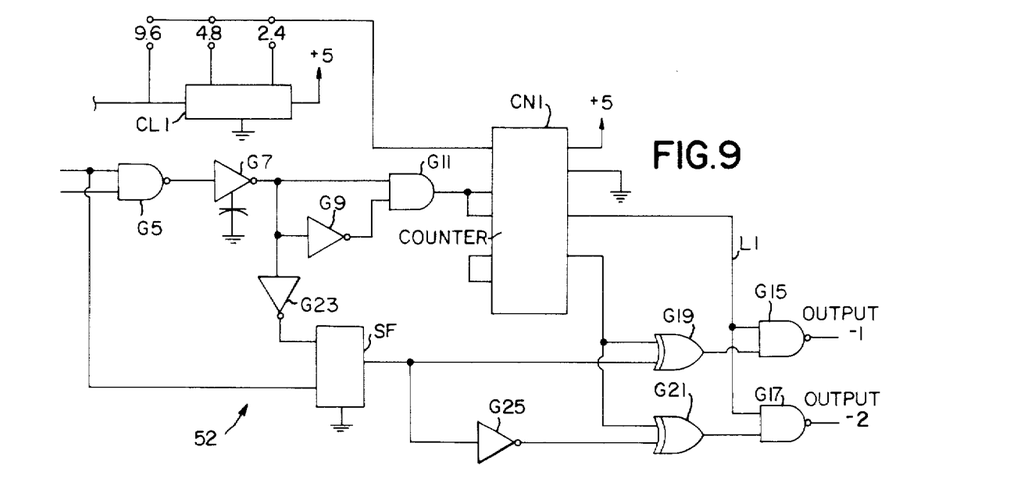
FIG. 9 is an electrical schematic of the regenerator portion of the driver circuitry of FIG. 8.

Once the incoming signal has been decoded, it is easily routed through routing array 27 and buffered with the line drivers. The bipolar signal is easily regenerated by taking the differential output between a pair of line drivers 49 and 51 (FIG. 8) and a regenerator circuit 52 which constitute drivers 31 and 40. Such a regenerated bipolar signal is shown on the lowest line of FIG. 7. Since all signals remain in their digital form in the module, no transformers are required, thus eliminating the speed restrictions of prior devices. In addition this regenerates the signal between each pair of ports, thereby eliminating the attenuation problem otherwise caused by powered-off terminals. The present circuit is capable of regenerating bipolar network signals at any speed up to the propagation limit of the differential receivers and drivers, e.g. well over 1 MHz. It is preferable that the digital signal be regenerated by regenerator circuit 52 before the bipolar signal is regenerated by line drivers 49 and 51. This is accomplished by the circuitry of FIG. 9. The regeneration circuit 52 as shown in FIG. 9 takes the two digital signals from routing array 27 and supplies these to a NAND Gate G5. The output of Gate G5 is thus low only when both of the digital signals are high. The output of Gate G5 is inverted by an inverter G7. This inverted output is supplied to a second inverter G9 and an AND Gate G11. The other input to AND Gate G11 is the inverted output of inverter G9 so that the output of AND Gate G11 is a series of pulses which occur each time the output of inverter G7 goes positive. This series of pulses is supplied to the two reset pins of an MC 14520 type dual binary CN1 counter made by Motorola. The first clock input of this counter is connected by means of a suitable jumper to the master clock CL1 of the module. This input is a series of pulses at 2.4, 4.8 or 9.6 MHz as selected by the jumper. The first enable input of counter CN1 is held high. The second clock input of counter CN1 is tied to ground and its second enable input is connected to the Q3 output of the first counter of CN1. As a result of this configuration, counter CN1 has two 50% duty cycle squarewave outputs which differ by a factor of 2 in their frequency. The higher frequency output is supplied on a line L1 to the inputs of a pair of NAND Gates G15 and G17. The lower frequency output is supplied to a pair of exclusive OR Gates G19 and G21. The outputs of exclusive OR Gates G19 and G21 are connected to the other inputs of NAND Gates G15 and G17 respectively. The other inputs of exclusive OR Gates G19 and G21 are derived as follows. The output of inverter G7 is supplied through yet another inverter G23 to the clock input of a D-type shift register SF. The data input for this shift register is one of the data lines which is also an input to NAND Gate G5. The output of the shift register is a pattern of highs and lows or 1's and 0's which represent the data in the data stream. This pattern is supplied to exclusive OR Gate G19 and indirectly, through an inverter G25, to exclusive OR Gate G21. The output of NAND Gate G15 is accordingly a completely regenerated signal labeled OUTPUT-1 which is supplied to line driver 49 (FIG. 8) while the output of NAND Gate G17 is a completely regenerated output labeled OUTPUT-2 which is supplied to line driver 51. The differential output of line drivers 49 and 51 is a bipolar signal suitable for supplying to the terminal. From the above, it will be seen that the circuit of FIG. 9 completely recovers the timing of the data stream which otherwise might be degraded by the operation of the terminals to which to the module port is connected.

Figure 10:
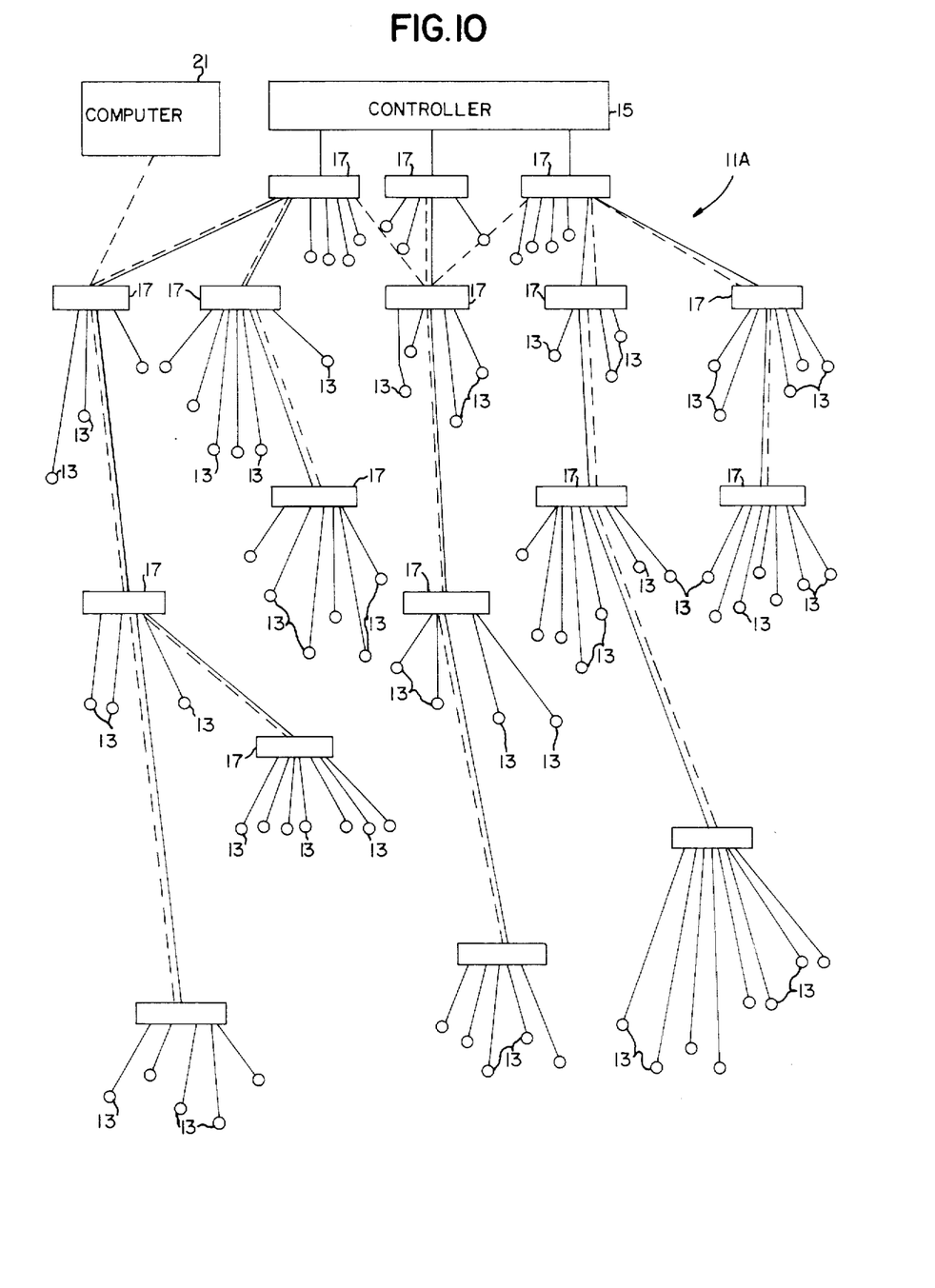
FIG. 10 is a schematic of the system of the present invention under external control.

In addition to those elements already described, module 17 (FIG. 2) includes an auxiliary communication port 48 defined by a receiver 49 and a driver 51 over which it communicates with computer 21. The modules are capable of operating in two modes: a stand-alone mode which has been described up to this point and a computer-controlled mode which involves auxiliary communication port 48. The connections to the auxiliary communications ports of the various modules in the system 11A of FIG. 10 are indicated by dashed lines. Note also in FIG. 10 that the present invention is not limited to one first-level module. One can use as many first level modules as the controller 15 will support (usually three).

External computer 21 fully automates the modular systems shown in FIGS. 1 and 10. It operates to continually monitor the state of each module and data terminal in the network and report to the operator any malfunctions that occur. External computer 21 can also be used for producing reports and for inquiring into the status of the system.

Each module contains in its internal programming a programmable address which identifies that module so that commands received from central computer 21 via the auxiliary communications port 48 may be acted upon by the module. Whenever data is received from the external computer via the auxiliary communications port, it acts as an interrupt request to microprocessor 35. The microprocessor thereupon initiates a third interrupt routine in which it first reads the information from the auxiliary port for an address and a command. If the address is not the address for that particular module 17, the command from the external computer is ignored. On the other hand if it is the address for that particular module, the microprocessor executes the command. Since microprocessor 35 is programmable, any number of different commands can be sent to it via the auxiliary port. However, a set of six commands, described below, has been found to adequately control the operation of a network such as those shown in FIGS. 1 and 10. These commands are Send Status Table, Send Counter Table, Alter Status Table, Alter Counter Table, Search, and Self Test.

If the command from external computer 21 is the Send Status Table command, the microprocessor formats a message which contains the entire status table for the module and then transmits that message over its auxiliary communications port to computer 21. This information is used by the external computer for tracking changes that have occurred on that particular module. The status table for the modules shown contains nine bytes of data, one byte for the module itself and one byte for each port 29. Each byte represents the following possible attributes of the particular port: in-network, out-of-service, powered off, inverted pair, inactive, and link failure.

Microprocessor 35 includes in memory an intermittent counter table for the module. There are two entries for each port in this table. The first represents the actual value of a counter for that port which value represents the amount of time since that port was last found to be active. The second entry is a maximum value of the counter for that port. In the computer-controlled mode, if the actual count exceeds the preset, maximum count for that port, the port is declared inoperative and routing array 27 is controlled to route the data stream around that port. When the command from computer 21 is the Send Counter Table command, the microprocessor formats a message containing the entire intermittent counter table for the module and then transmits that message via the auxiliary communications port to computer 21. This information is then processed as desired by computer 21. For example, it is useful in continually monitoring the status of all the terminals in the system.

The Alter Status Table command is accompanied by a port number and a value. When this command is received, the microprocessor changes the byte in the status table corresponding to the port number received to the new value included with the command. This command is used to remotely activate and deactivate ports on the module.

The fourth command, the Alter Counter Table command, is also accompanied by a port number and a value. When the microprocessor receives this command, it changes the byte in the counter table corresponding to the port number received to the new count value included with the command. This command is used to change the intermittent counter thresholds associated with the module ports.

Upon receipt of the Search command, microprocessor 35 initiates the same testing sequence described above in connection with stand-alone operation to identify the particular fault. In the computer-controlled mode of operation, this command is used to identify powered off terminals in the network.

The Self Test command causes the microprocessor to test itself and report the results of the test back over the auxiliary port to external computer 21.

The six commands are effective only when the auxiliary communications port is operating. If the external computer is not being used, the module reverts to stand-alone operation and action caused by exceeding the intermittent counter thresholds is inhibited.

From the above it will be seen that a method of the present invention includes the steps of arranging a plurality of data terminals 13 in a plurality of groups, and providing a module 17 for each group of terminals for detecting and identifying faults in the operation of the module and associated terminals. The method further includes the step of including at least one module in at least some of the groups so that the modules form a tree structure. For each module, a data stream is passed serially through the data terminals and modules connected to the ports 29 of that module. Each module determines whether a fault exists in the transmission of the data stream, and when a fault is detected, sequentially tests the data terminals and modules connected to its module ports to identify any inoperative data terminals and modules. The data stream is automatically routed around any inoperative data terminals or modules connected to the module ports, and the status of all module ports is recorded in a memory of the microprocessor. Furthermore, the previously inoperative data terminals and modules are periodically retested and if now operative are reinserted into the path of the data stream.

In view of the above, it will be seen that the objects of this invention are achieved and other advantageous results are obtained.

As various changes could be made in the above constructions and method without departing from the scope of the invention, it is intended that all matter contained in the above description or shown in the accompanying drawings shall be interpreted as illustrative and not in a limiting sense.

What is claimed is:

1. A modular system for controlling the routing of data through a plurality of data terminals comprising:
    at least one first-level module;
    at least one second-level module;
    each of said modules having means for receiving a data stream from a source, the first-level module being the source for the second-level module;
    each of said modules further having a plurality of ports, each port being suitable for transmitting data to and receiving data from data devices such as data terminals and other modules, the second-level module being connected to a port of the first-level module;
    each of said modules including interconnecting means connected to the ports thereof for serially connecting the ports for flow of the data stream serially through the operable data devices connected to said ports, said interconnecting means being internally controllable to open a selected one of a plurality of data paths among the ports;
    at least some of the ports having driver means associated therewith for regenerating the data stream as it passes between ports in the selected data path;
    each module having module output means for supplying the data stream from the module to a destination device, the destination device of the second-level module being the first-level module; and
    internal means for each module for automatically detecting a fault between the receiving means and the output means of that module, said detecting means being responsive to the detection of such a fault to control the interconnecting means to open a fault-free data path between the receiving means and the output means if any such path exists.

2. The modular system as set forth in claim 1 further including a plurality of additional modules connected to the first-level module ahd second-level module to form a tree structure, at least some of the additional modules having data terminals connected to at least some of their ports.

3. The modular system as set forth in claim 1 wherein each port of the modules has driver means associated therewith.

4. The modular system as set forth in claim 1 wherein the interconnecting means includes a selectable data path directly from the receiving means to the output means, which path bypasses the module ports.

5. The modular system as set forth in claim 1 wherein the interconnecting means is electronically controlled to change from one data path to another.

6. The modular system as set forth in claim 1 wherein the data terminals are point of sale devices disposed throughout a store, further including controller means for supplying control information through all the modules to the data terminals, at least some of the modules being disposed at locations throughout the store which are selected to reduce the wiring being the data terminals and their associated modules.

7. The modular system as set forth in claim 1 wherein each module further includes means responsive to the fault detecting means for identifying the port, if any, associated with the fault.

8. The modular system as set forth in claim 7 wherein the identifying means includes means for generating a test pattern, said interconnecting means supplying said test pattern to a port under test, and means for examining the data stream received back from the port under test to determine if the device connected to that port has failed.

9. The modular system as set forth in claim 1 wherein the data stream received by the receiving means is bipolar, further including means for decoding the bipolar data stream to a digital data stream, the interconnecting means providing digital data paths between the ports.

10. The modular system as set forth in claim 1 wherein the fault detecting means includes means for examining the data stream as it enters and leaves the module for the presence of a control character.

11. The modular system as set forth in claim 10 wherein the fault detecting means further includes programmable logic means responsive to the examining means to initiate a fault identification routine when the control character is absent from the data stream for a predetermined length of time.

12. The modular system as set forth in claim 1 wherein the fault detecting means includes programmable logic means responsive to the detection of a fault to identify the fault.

13. The modular system as set forth in claim 12 wherein the logic means includes a memory having a status table containing the operational status of each port of the module.

14. The modular system as set forth in claim 13 further including means for generating a test pattern for application to each port, the logic means being responsive to the detection of a fault as a result of the application of the test pattern to a port to indicate in the status table that the data device connected to the port is inoperative.

15. The modular system as set forth in claim 14 wherein the logic means is responsive to the updating of the status table to control the interconnecting means to open a data path which includes all operative data devices and excludes all inoperative data devices.

16. The modular system as set forth in claim 1 wherein the detecting means includes means for identifying the fault.

17. The modular system as set forth in claim 16 wherein the detecting means includes means responsive to the detection of a fault to test each port in a predetermined sequence to identify the fault.

18. The modular system as set forth in claim 17 wherein the testing means includes a memory for recording the operational status of each port tested.

19. The modular system as set forth in claim 16 wherein the fault detecting means includes means for periodically retesting the operational status of any ports previously found to be inoperative and being responsive to a change in operational status of such a port to control the interconnecting means to open a data path between the ports that includes said previously inoperative port.

20. The modular system as set forth in claim 19 wherein the retesting means includes an internal timer for initiating the retesting of the previously inoperative ports.

21. The modular system as set forth in claim 1 further including an auxiliary port over which the module can receive control signals from an external computer, said module having a first mode of operation when the auxiliary port is connected to said computer and a second mode of operation when the auxiliary port is not connected with said computer.

22. The modular system as set forth in claim 21 in which each module has a unique address so that commands from the computer over the auxiliary port including the address of that module are acted upon only by that module.

23. The modular system as set forth in claim 21 wherein each module includes a status table reflecting the operational status of each port for that module, the module being responsive to a predetermined command on the auxiliary port to send the contents of the status table to the external computer.

24. The modular system as set forth in claim 23 wherein the status table includes data representing the operational status of the entire module.

25. The modular system as set forth in claim 23 wherein the module is responsive to a second predetermined command on the auxiliary port to alter the contents of the status table, whereby the external computer can activate and deactivate ports of the module.

26. The modular system as set forth in claim 25 wherein the second predetermined command includes a unique description of the port to be activated or deactivated.

27. The modular system as set forth in claim 21 wherein each module includes a counter table having an entry for each port reflecting the actual elapsed time and maximum allowable time since the port was last found to be operative, said counter table being disregarded in the second mode of operation of the module.

28. The modular system as set forth in claim 27 wherein the module is responsive to the receipt of a predetermined command on the auxiliary port to send the contents of the counter table to the external computer.

29. The modular system as set forth in claim 27 wherein the module is responsive to a second predetermined command to change the maximum allowable time for a port in the counter table.

30. The modular system as set forth in claim 21 wherein the detecting means is responsive to a predetermined command from the external computer to sequentially test each port to determine the operational status thereof.

31. The modular system as set forth in claim 21 wherein the detecting means includes logic means having the capability of testing itself for proper functioning, said module being responsive to a predetermined command on the auxiliary port to test the logic means and report the results of that test back to the external computer.

32. The method of operating a plurality of data terminals comprising the steps of:
arranging the terminals in a plurality of groups;
providing a module for each group of terminals for detecting and identifying faults in the operation of the module and associated terminals, each module having a plurality of ports for connection to data terminals and modules;
including at least one module in at least some of the groups so that the modules form a tree structure;
for each module, passing a data stream serially through the data terminals and modules connected to the ports thereof;
for each module, determining whether a fault exists in the transmission of the data stream; and
when a fault is detected, sequentially testing the data terminals and modules connected to the module ports to identify any inoperative data terminals and modules.

33. The method as set forth in claim 32 further including the step of automatically routing the data around any inoperative data terminals or modules connected to the module ports.

34. The method as set forth in claim 32 including the further step of recording in a memory the status of all module ports.

35. The method as set forth in claim 32 including the further step of periodically retesting data terminals and modules previously determined to be inoperative and if they are now operative automatically reinserting them into the path of the data stream.

36. The method as set forth in claim 32 wherein the modules each include an auxiliary port for communication with an external computer, including the further step of deactivating selected data terminals and modules upon receipt of a predetermined command on the auxiliary port.

37. The method as set forth in claim 36 including the further step of activating selected data terminals and modules upon receipt of a second command on the auxiliary port.

38. The method as set forth in claim 32 wherein each module includes a status table reflecting the operational status of its ports, including the further step of transmitting the contents of the status table upon receipt of a first command.

39. The method as set forth in claim 32 wherein each module includes a counter table reflecting the actual and maximum elapsed times since the data terminals and modules connected to the module ports were last found to be operative, including the further step of transmitting the contents of the counter table upon receipt of a first command.

40. The method as set forth in claim 32 wherein the modules each include an auxiliary port for communication with an external computer, including the further step of testing the operational status of each module port upon receipt of a predetermined command on the auxiliary port.

* * * * *